(12) United States Patent  
Buergi

(10) Patent No.: US 11,265,093 B2  
(45) Date of Patent: Mar. 1, 2022

(54) METHOD AND DEVICE FOR GROUP DELAY VARIATION COMPENSATION

(71) Applicant: u-blox AG, Thalwil (CH)

(72) Inventor: Clemens Buergi, Zurich (CH)

(73) Assignee: u-blox AG, Thalwil (CH)

( * ) Notice: Subject to any disclaimer, the term of this patent is extended or adjusted under 35 U.S.C. 154(b) by 16 days.

(21) Appl. No.: 16/914,515

(22) Filed: Jun. 29, 2020

(65) Prior Publication Data

US 2021/0409131 A1 Dec. 30, 2021

(51) Int. Cl.
| | | |
|---|---|---|
| *H04B 17/364* | (2015.01) | |
| *H04B 17/21* | (2015.01) | |
| *H04B 17/40* | (2015.01) | |
| *H04B 7/216* | (2006.01) | |

(52) U.S. Cl.
CPC ........... *H04B 17/364* (2015.01); *H04B 7/216* (2013.01); *H04B 17/21* (2015.01); *H04B 17/404* (2015.01)

(58) Field of Classification Search
CPC ...... H04B 17/364; H04B 17/21; H04B 7/216; H04B 17/404
See application file for complete search history.

(56) References Cited

U.S. PATENT DOCUMENTS

| | | | | |
|---|---|---|---|---|
| 5,854,815 A | * | 12/1998 | Lennen | ................ H04B 1/7085 375/343 |
| 8,442,020 B1 | * | 5/2013 | Peterson | ................ G01S 19/29 370/342 |
| 9,866,368 B1 | * | 1/2018 | Patel | ........................ H04L 27/26 |
| 2004/0125015 A1 | * | 7/2004 | King | ...................... G01S 5/0221 342/357.69 |
| 2006/0133546 A1 | | 6/2006 | Demir et al. | |
| 2010/0164798 A1 | | 7/2010 | Yudanov et al. | |
| 2013/0282319 A1 | * | 10/2013 | De Marco | ................ H04B 1/10 702/79 |
| 2013/0329841 A1 | | 12/2013 | Keegan et al. | |
| 2021/0058588 A1 | * | 2/2021 | Abreo | ...................... H04N 5/33 |

OTHER PUBLICATIONS

Quélhas, M.F. et al.: "Efficient Group Delay Equalization of Discrete-Time IIR Filters", *Program of Electronical Engineering*, Rio de Janeiro, RJ—Brazil, (2004), 4 pages.

* cited by examiner

*Primary Examiner* — Christine Ng
(74) *Attorney, Agent, or Firm* — Finnegan, Henderson, Farabow, Garrett & Dunner LLP

(57) ABSTRACT

A method for compensating group delay variations in a CDMA spread spectrum receiver, comprising: receiving an RF signal; generating an ideal replica signal; filtering the RF signal by one or more filters; obtaining an ideal auto-correlation function (ACF) of the ideal replica signal; distorting the ideal ACF to generate a distorted ACF by a filtering model of the one or more filters; aligning the ideal ACF and the distorted ACF; calculating a set of correction factors based on a ratio of the ideal ACF and the distorted ACF; calculating a cross-correlation signal based on the filtered RF signal and the ideal replica signal; and obtaining a compensated correlation signal by applying the set of correction factors to the cross-correlation signal.

20 Claims, 6 Drawing Sheets

METHOD AND DEVICE FOR GROUP DELAY VARIATION COMPENSATION

TECHNICAL FIELD

Apparatus and method consistent with the present disclosure relate generally to a system for compensating variations in group delay in a spread spectrum receiver.

BACKGROUND

In radio-frequency (RF) circuits, filters of different types are used in various applications. It is understood that when RF signals pass through filters, some amount of delay results. An RF signal may contain many frequencies. For example, a spread-spectrum RF signal, when passing through filters, will result in a group delay. A group delay may be a delay of the amplitude envelopes of the signal components of the different frequencies.

In practice, filters may have frequency dependent non-linear effects on the phases of the signal components of a spread-spectrum RF signal. These effects may cause the group delay to vary over frequency. Variations in group delay may distort the shape of the spread-spectrum signal passing through filters.

In Global Navigation Satellite System (GNSS) applications, a distance between a GNSS receiver and a GNSS satellite may be determined by a range measurement. The range measurement is based on a cross-correlation of a received spread-spectrum signal from the GNSS satellite with a replica signal generated by the GNSS receiver, the replica signal being identical to the spread spectrum signal, except for a time delay. If the received spread-spectrum signal is distorted by variations in group delay caused by filters, a cross-correlation function of these two signals may also be distorted. This distortion of the cross-correlation function shape may result in errors in the range measurement.

Prior efforts to compensate for variations in group delays attempted to implement filters having improved or reduced non-linear effects. This, however, increased requirements on the filter components. Other efforts involved adding circuitry prior to signal processors, or attempting to compensate for variations in group delays by introducing signal specific correction factors, the calculation of which is intensive and time consuming.

SUMMARY

According to some embodiments of the present disclosure, there is provided a method for compensating group delay variations in a CDMA spread spectrum receiver, comprising: receiving an RF signal; generating an ideal replica signal; filtering the signal by one or more filters; obtaining an ideal auto-correlation function (ACF) of the ideal replica signal; distorting the ideal ACF to generate a distorted ACF by a filtering model of the one or more filters; aligning the ideal ACF and the distorted ACF; calculating a set of correction factors based on a ratio of the ideal ACF and the distorted ACF; calculating a cross-correlation signal based on the filtered RF signal and the ideal replica signal; and obtaining a compensated correlation signal by applying the set of correction factors to the cross-correlation signal.

According to some embodiments of the present disclosure, there is also provided a CDMA spread spectrum device for compensating group delay variations, comprising: a receiver configured to receive an RF signal; one or more filters configured to filter the RF signal; and at least one processor configured to: generate an ideal replica signal; obtain an ideal auto-correlation function (ACF) of the ideal replica signal; distort the ideal ACF to generate a distorted ACF by a filtering model of the one or more filters; align the ideal ACF and the distorted ACF; calculate a set of correction factors based on a ratio of the ideal ACF and the distorted ACF; calculate a cross-correlation signal based on the filtered RF signal and the ideal replica signal; and obtain a compensated correlation signal by applying the set of correction factors to the cross-correlation signal.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Figure 1A:
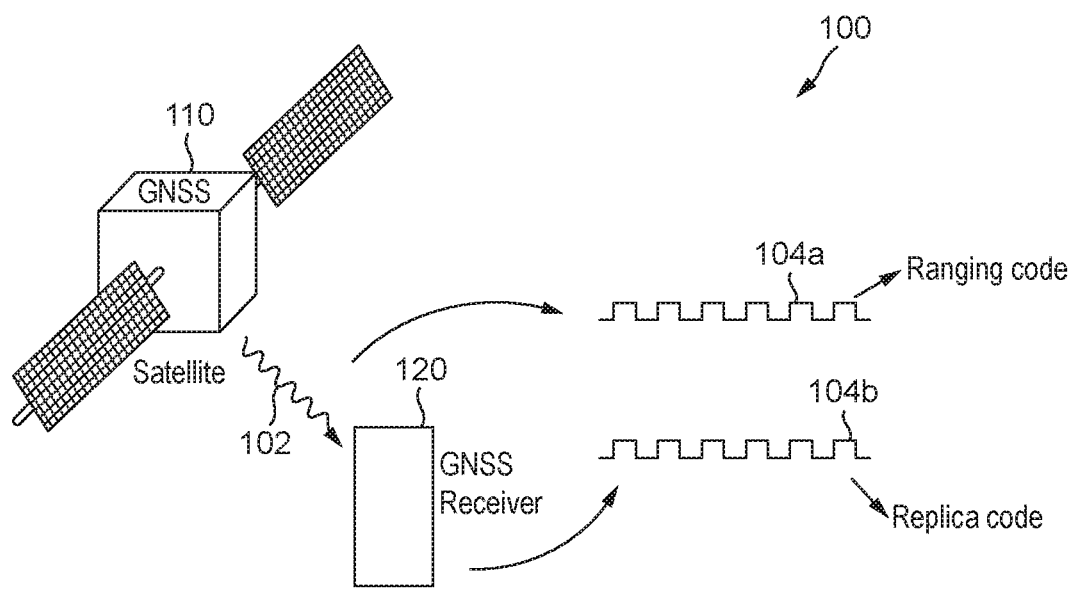
FIGS. 1A and 1B illustrate an exemplary GNSS system including a receiver for compensating variations in group delay, consistent with some embodiments of the present disclosure.
Figure 1B:
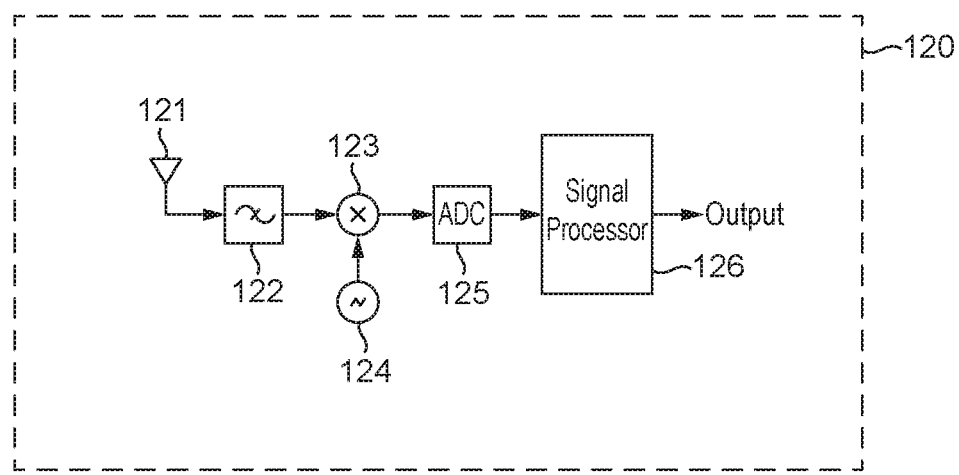

FIG. 1A illustrates an exemplary application of a receiver device and method for compensating variations in group delay. In some embodiments, the receiver device and method for compensating variations in group delay may be implemented in a global navigation satellite system (GNSS) 100. The GNSS 100 includes at least one GNSS satellite 110 and a GNSS receiver device 120. In some embodiments, GNSS receiver device 120 may be a CDMA receiver device. In some embodiments, GNSS satellite 110 transmits an RF signal 102 for receipt by GNSS receiver 120. RF signal 102 may be a spread spectrum signal. A spread spectrum signal is a signal having components in a plurality of different frequencies. FIG. 1B illustrates an exemplary configuration of GNSS receiver 120. GNSS receiver 120 includes one or more components configured to receive and process RF signal 102. As illustrated in FIG. 1B, GNSS receiver 120 includes, but is not limited to, an antenna 121, a filter 122, a mixer 123, an oscillator 124, an analogue-to-digital converter (ADC) 125, and a signal processor 126 coupled as shown. Referring also to FIG. 1A, in some embodiments, RF signal 102 may contain information for measuring a distance between GNSS satellite 110 and GNSS receiver 120 such as, for example, a ranging code 104a. Ranging code 104a may be a predetermined digital signal, containing a series of 1s and 0s, repeated at a fixed time interval. GNSS receiver 120 may also generate a replica code 104b. Replica code 104b may be identical to ranging code 104a, repeated also at the same fixed time interval. In some embodiments, replica code 104b may be generated by signal processor 126.

GNSS receiver 120 receives ranging code 104a from GNSS satellite 110. RF signal 102 arrives at GNSS receiver 120 after a travel time at the speed of RF signal propagation. GNSS receiver 120 may determine the distance to GNSS satellite 110 by determining the travel time of RF signal 102. In some embodiments, the travel time of RF signal 102 may be determined by deriving a timing offset between ranging code 104a and replica code 104b. For example, signal processor 126 may calculate a cross-correlation function between ranging code 104a and replica code 104b. Since ranging code 104a and replica code 104b are identical, the cross-correlation function is an auto-correlation function (ACF). Because receiver components such as filter 122 may introduce delays in addition to the travel time of RF signal 102, signal processor 126 takes into account this additional delay time in order to derive an accurate measurement. In some embodiments, filter 122 may have non-linear frequency effects that introduce variations in group delay of RF signal 102. For example, filter 122 may cause different amount of delay for different frequency components of RF signal 102. The differences in the amounts of delay may be non-linear, hence, there is a need for signal processor 126 to compensate for such differences.

A person skilled in the art will now appreciate that FIGS. 1A and 1B merely illustrate a non-limiting application of a receiver device and method for compensating variation in group delay. The embodiments of the present disclosure may be applicable in other suitable RF applications. Moreover, one or more circuit components of GNSS receiver 120, such as antenna 121 or filter 122, may represent a plurality of components. For example, filter 122 may represent a plurality of filters. Additionally, one or more circuit components of GNSS receiver 120 may be added, removed, or modified without departing from the inventive concept of the present disclosure.

Figure 2:
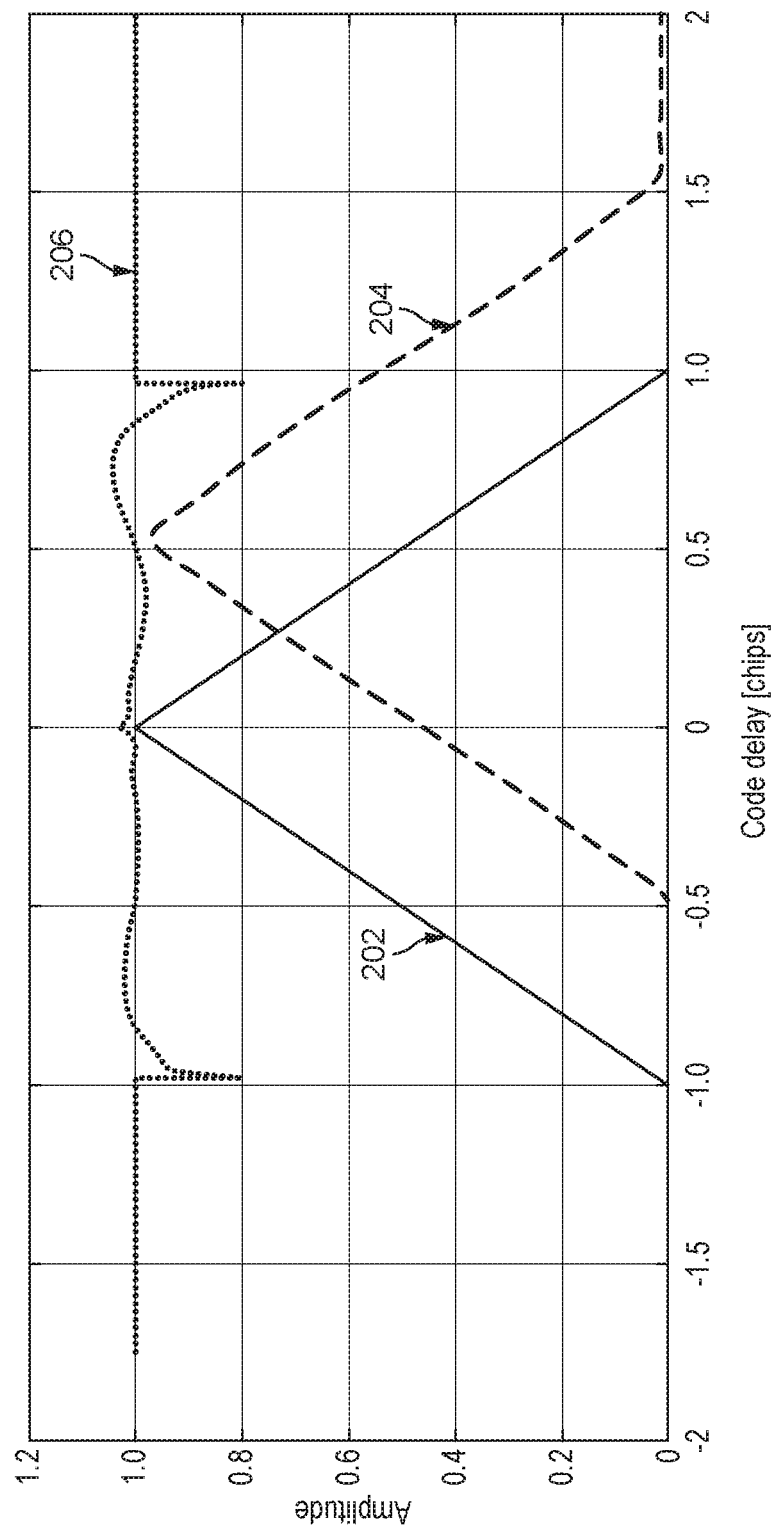
FIG. 2 is a plot illustrating examples of an ideal auto-correlation function and a distorted auto-correlation function, consistent with some embodiments of the present disclosure.

FIG. 2 is a plot illustrating examples of an ideal ACF and a distorted ACF. The plot of FIG. 2 is generated by a simulation. In FIG. 2, the horizontal axis represents a delay domain in units of code chips, and the vertical axis represents amplitude. Distortion in the simulation is for a typical model of a GNSS receiver, such as one depicted in FIGS. 1A and 1B.

Curve 202 represents the ideal ACF. The ideal ACF is calculated by cross-correlating ranging code 104a with replica code 104b, without taking into account variations in group delay introduced by filter 122. Curve 202 has a peak amplitude of 1, a time corresponding to this peak representing the traveled time for the RF signal 102 to reach GNSS receiver 120 from GNSS satellite 110. Curve 204 represents a distorted ACF that may be generated by convolution of the ideal ACF and an impulse function that models filter 122. Curve 206 represents correlator tap corrections. Correlator tap corrections represent locations in the delay domain for which the ideal ACF and the distorted ACF are sampled. For example, in a spread-spectrum receiver, every correlator tap correction outputs a point on the distorted ACF.

A cross-correlation of a distorted filtered ranging code with a replica code at the output of a filter can be represented as m(k) in the following equations:

$$m(k)=(c(k)+n(k))*h(k)*c_{rep}(k) \qquad 1(a)$$

$$m(k)=c(k)*c_{rep}(k)*h(k)+n(k)*c_{rep}(k)*h(k) \qquad 1(b)$$

In equations 1(a) and 1(b), k is a time step, c(k) represents the ranging code 104a, $c_{rep}(k)$ represents the replica code 104b, h(k) represents an impulse response of filter 122, and n(k) represents additive white noise. Because the ideal ACF, or $c_{acf}(k)$, is simply the convolution of c(k) and $c_{rep}(k)$, equation 1(b) can be simplified to:

$$m(k)=c_{acf}(k)*h(k)+n(k)*c_{rep}(k)*h(k) \qquad 1(c)$$

As shown in equation 1(c), m(k) represents distortion of the ideal ACF by the impulse function h(k) and the additive white noise. In other words, m(k) is the distorted ACF, where $c_{acf}(k)*h(k)$ represents the noiseless filter distortion, and $n(k)*c_{rep}(k)*h(k)$ represents the noise term. The convolutions of equation 1(c) result in:

$$m(k) = \sum_{i=0}^{N_h-1} c_{acf}(k-i) \cdot h(N_c - 1 - i) + \text{noise term} \qquad (2)$$

$N_h$ represents the length of the number of samples in the function h(k), and $N_c$ represents the length of the ideal ACF. In some embodiments, the noise term in equation (2) can be ignored, which means that for every delay of interest, correction factors $T_c(k)$ can be determined by:

$$T_c(k) = \frac{c_{acf}(k)}{\sum_{i=0}^{N_h-1} c_{acf}(k-i) \cdot h(N_c - 1 - i)} \qquad (3)$$

Equation (3) demonstrates that the correction factors can be calculated by dividing the values of the ideal ACF by the values of the distorted ACF. Equation (3) also demonstrates that there is a need to align the ideal ACF and the distorted ACF in the delay domain before calculating the correction factors. In some embodiments, taking a group delay of the filter to align the ideal ACF and the distorted ACF may be insufficient, since the group delay of the filter may vary over frequency. Moreover, since variations in group delay cause a shape of the ideal ACF to be distorted, multiple reference points may be used for measurement alignment. For example, a delay measured from the maximum of the ideal ACF to the maximum of the distorted ACF may be used for alignment. Another alignment method may be performing a least squares fit of the ideal ACF to the distorted ACF, and take the fit position as the delay for alignment.

In some embodiments, it may be advantageous to use the ideal ACF to calculate the correction factors, as amplitude variations are also compensated by these correction factors, especially in the case of low pass filtering. In some embodiments, the ideal ACF may be first band-limited with linear phase filters before calculating the correction factors.

Figure 3:
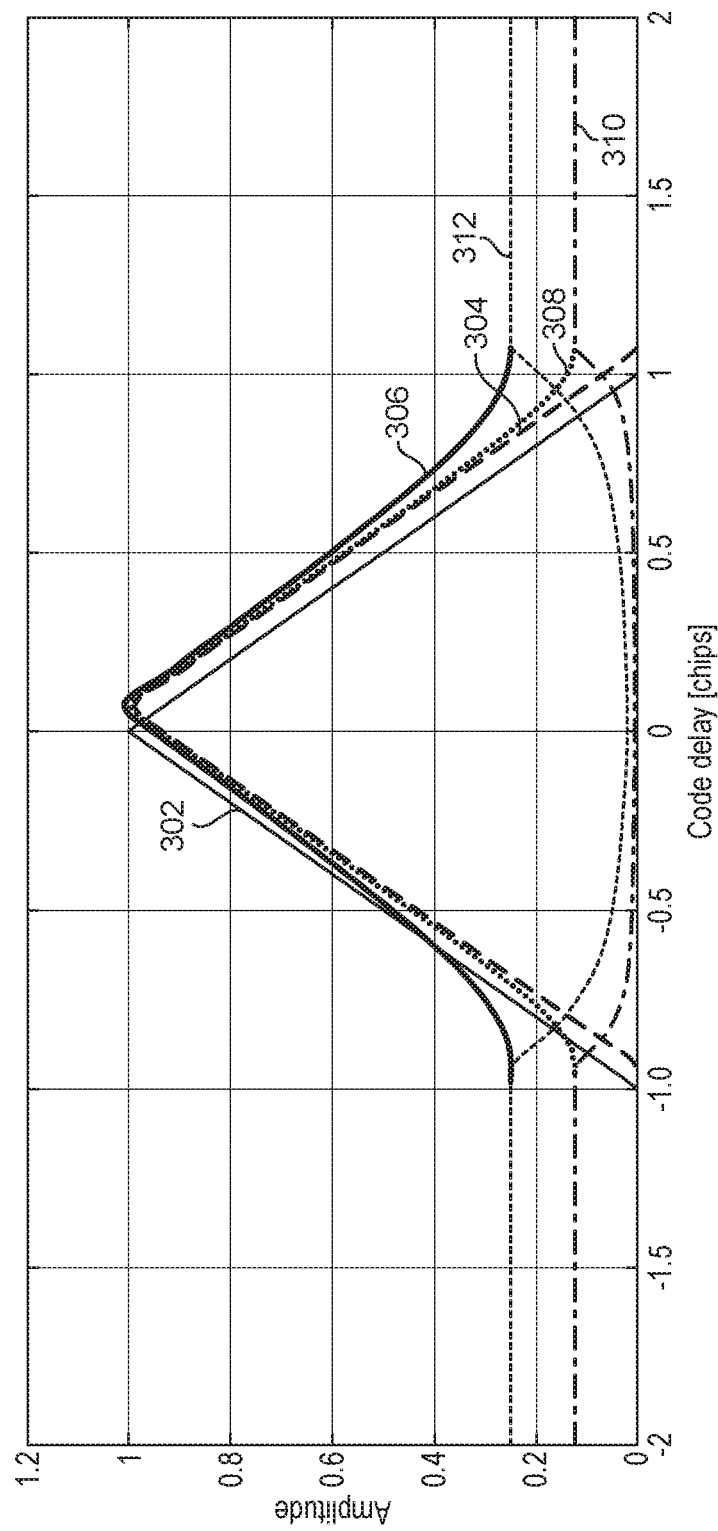
FIG. 3 is a plot illustrating examples of effects of signal-to-noise ratio (SNR) correction on auto-correlation functions, consistent with some consistent with some embodiments of the present disclosure.

FIG. 3 is a plot illustrating examples of the effects of additive white noise on auto-correlation functions. The plot of FIG. 3 is generated by a simulation. In FIG. 3, the horizontal axis represents the delay domain, and the vertical axis represents amplitude.

Curve 302 represents an ideal ACF, corresponding to curve 202 of FIG. 2. Curve 304 represents a distorted ACF without effect of noise, corresponding to curve 204 in FIG. 2. Curve 308 represents the distorted ACF affected by a first noise signal, having a SNR of 20.0 dB. Curve 306 represents the distorted ACF affected by a second noise signal, having a SNR of 14.0 dB. Curve 310 represents the first noise signal. Curve 312 represents the second noise signal. As seen in FIG. 3, the first noise signal and the second noise signal both cause additional distortion to the ideal ACF in comparison with distortion only caused by filtering without noise.

In some embodiments, the noise term, e.g., in equation (2), is not ignored, and further compensation terms are needed to take into account the effect of noise. Because of the non-linear behavior of the magnitude of the distorted ACF, scaling the magnitude is not desirable, as signal and noise may need to be scaled by different factors. It is desirable that only the magnitude of the distorted ACF is scaled. Recall that the distorted ACF is represented in equation 1(c) as:

$$m(k)=c_{acf}(k)*h(k)+n(k)*c_{rep}(k)*h(k) \quad (1c)$$

In some embodiments, filter 122 is not expected to have an appreciable effect on the additive white Gaussian noise (AWGN) characteristics of the noise term. Hence the expectation value of the magnitude of m(k), or |m(k)|, is the Riciman mean $R_m(v(k),\sigma)$ with parameters given by the following equation:

$$v(k) = |c_{acf}(k)*h(k)|, \sigma = \frac{Std(n(k)*c_{rep}(k)*h(k))}{\sqrt{2}} \quad (4)$$

In equation (4), v(k) is the magnitude of the distorted ACF without noise. Thus, the magnitude of distortion caused by noise may be given as:

$$|m_N(k)| = \sigma \cdot \sqrt{\frac{\pi}{2}} \cdot L_{1/2}\left(\frac{-v(k)^2}{2\sigma^2}\right) - v(k) \quad (5)$$

$L_{1/2}$ represents Laguerre polynomials. Because the noise term (e.g. $|m_N(k)|$) depends on the ratio of signal to noise (SNR), distortion of the ideal ACF may slightly change the SNR on the observed magnitude of the distorted ACF, in turn causing a change in the noise contribution to the magnitude of distorted ACF. In other words, if a scaling factor $C_t$ is applied to correct for distorted ACF, the noise does not scale by the same amount as the signal, hence $R_m(v(k),\sigma) \cdot C_t \neq R_m(v(k)C_t,\sigma)$. Therefore, in order to correct for distortion, an additional correction factor $C_s$ is introduced such that $R_m(v(k),\sigma) \cdot C_t \cdot C_s = R_m(v(k)C_t,\sigma)$. $C_s$ may be given by equation (6):

$$C_s = \frac{L_{1/2}\left(\frac{-v^2 C_t^2}{2\sigma^2}\right)}{L_{1/2}\left(\frac{-v^2}{2\sigma^2}\right) \cdot C_t} \quad (6)$$

In some embodiments, the scaling factor $C_t$ corresponds to the correction factor $T_c$ in equation (3).

Figure 4:
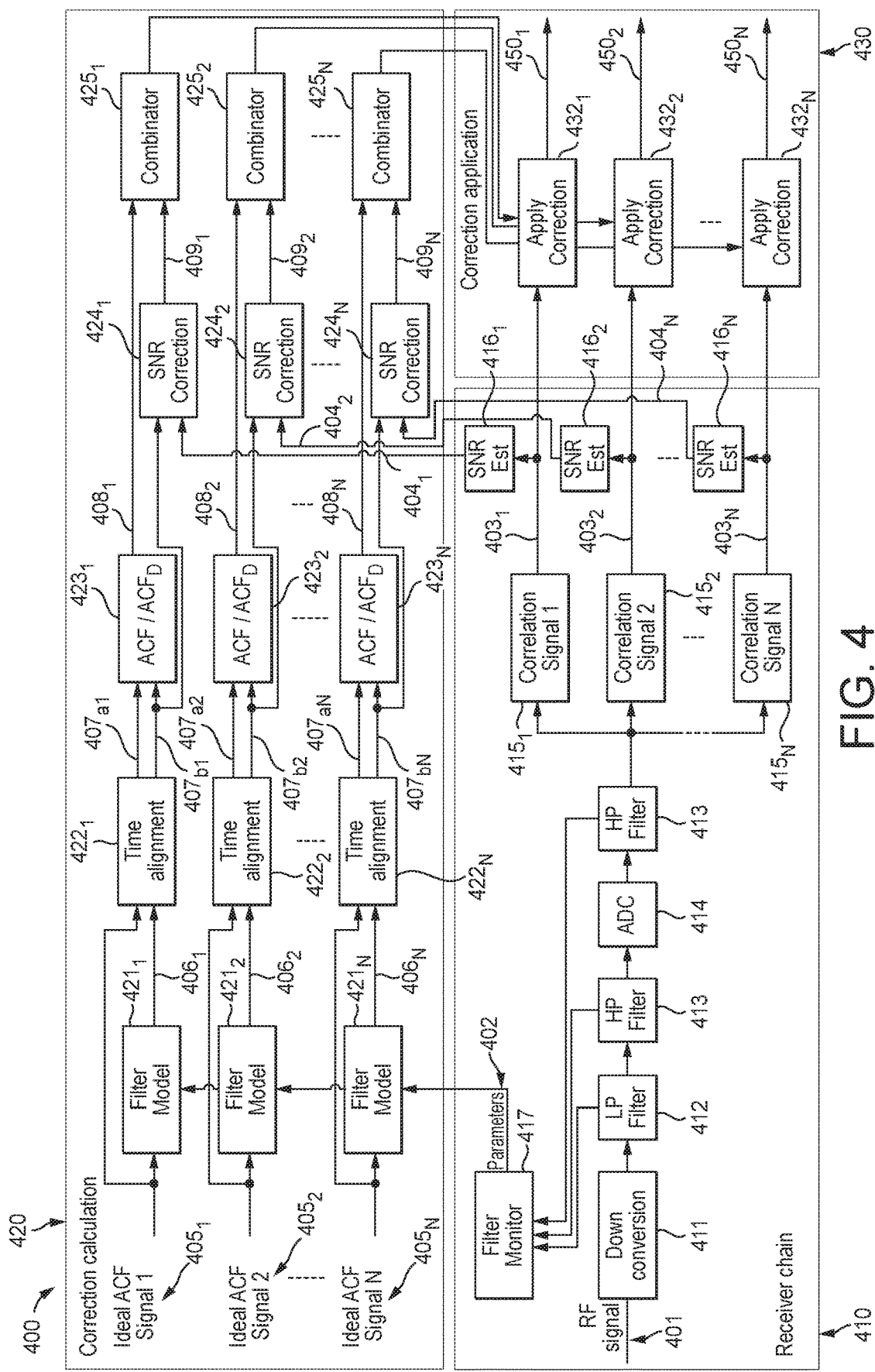
FIG. 4 is a schematic diagram illustrating an exemplary receiver for compensating variations in group delay, consistent with some embodiments of the present disclosure.

FIG. 4 is a schematic diagram illustrating a non-limiting example of a receiver 400 for compensating variations in group delay. Receiver 400 includes a receiver chain 410, a correction calculation module 420, and a correction application module 430.

Receiver chain 410 includes one or more down conversion circuits 411, one or more filters including low-pass (LP) filter 412 and high-pass (HP) filters 413, an analog-to-digital converter (ADC) 414, signal correlators 415, SNR estimators 416, and a filter monitor 417.

Down conversion circuits 411 may include one or more components for receiving an RF signal 401, which may contain ranging code 104a, and for converting RF signal 401 from the RF carrier frequency to a baseband frequency. A person skilled in the art will now appreciate that down conversion circuit 411 may include one or more conventionally known components such as antennas, mixers, oscillators, filters, and/or amplifiers. In some embodiments, down conversion circuits 411 may filter RF signal 401 during the down conversion process. In some embodiments, additional filters not illustrated in FIG. 4 may be provided to filter RF signal 401 prior to down conversion by down conversion circuit 411.

LP filter 412 represents one or more filters adapted to allow signal components having a frequency below a cut-off frequency to pass, and to attenuate signal components having a frequency above the cut-off frequency. HP filter 413 represents one or more filters adapted to allow signal components having a frequency above a cut-off frequency to pass, and to attenuate signal components having a frequency below the cut-off frequency. LP filter 412 and HP filter 413 may have various parameters, some of which are known, while other parameters of LP filter 412 and HP filter 413 are dynamic. For example, some parameters of LP filter 412 and HP filter 413 may be temperature dependent such that these parameters may vary over time as the temperature of receiver chain 410 changes under continuous operation or under different conditions. Filter monitor 417 monitors these parameters of LP filter 412 and HP filter 413, and updates monitored parameters at predetermined time intervals for a filter model 421 of correction calculation module 420, as described below. The monitored parameters may include temperature, voltage, current, power, duty-ratio, operation time, and/or other parameters that may alter frequency response, phase response, group delay, and other aspects of LP filter 412 and HP filter 413. Filter monitor 417 provides as an output a filter parameter 402 for filter model 421.

In some embodiments, there may be provided additional filter elements, or circuit components having filtering characteristics not illustrated in FIG. 4. For example, there may be provided an image rejection filter, a surface acoustic wave (SAW) filter, an amplifier and/or mixer having filtering functions which may also exhibit non-linear phase behaviors. Filter monitor 417 may additionally monitor parameters of the additional filter elements, or circuit components, and update the monitored parameters at predetermined time intervals as filter parameter 402.

In some embodiments, one or more combinations of LP filter 412 and HP filter 413 may work together to filter RF signal 401. ADC 414 converts the filtered RF signal 401 from an analog signal form to a digital signal form. In some embodiments, LP filter 412 and HP filter 413 may further filter the digitized RF signal 401.

In some embodiments, one or more signal correlators 415 may cross-correlate the digitized RF signal 401 with a corresponding replica code. The corresponding replica code may be, for example, replica code 104b as illustrated in FIG. 1. In some embodiments, receiver 400 may receive multiple RF signals each containing one or more ranging codes, and there may be provided multiple signal correlators 415, such as signal correlators $415_1$, $415_2$, ..., $415_N$, such that each of the received RF signals is provided as an input to a corresponding signal correlator for cross-correlation with a corresponding replica code. In some embodiments, the one or more signal correlators 415 provide as outputs, measured distorted CCF 403. In some embodiments, multiple signal correlators 415 provide multiple measured distorted CCF 403, such as measured distorted CCF 1 $403_1$, measured distorted CCF 2 $403_2$, ..., measured distorted CCF N $403_N$, etc. In some embodiments, the replica codes may be stored on one or more computer-readable storage media, and may be retrieved by signal correlator 415 as needed. In some embodiments, RF signal 401 and replica codes need not be correlated at every point in time, and signal correlator 415 performs cross-correlation only at a number of sample points in time. These sample points may be referred to as taps. Hence, measured distorted CCF 403 at the output of signal correlator 415 may be a series of taps.

In some embodiments, one or more SNR estimators 416 estimate a signal-to-noise ratio (SNR) of measured distorted CCF 403. Multiple SNR estimators 416 may be provided in the case of multiple measured distorted CCF 403, such that each measured distorted CCF 403 has a corresponding SNR estimator 416. In some embodiments, measured distorted CCF 403 is provided as input for SNR estimator 416, and an SNR 404 is provided as an output of SNR estimator 416. For example, measured distorted CCF 1 $403_1$, measured distorted CCF 2 $403_2$, ..., measure distorted CCF N $403_N$ are provided to SNR estimators $416_1$ $416_2$, ..., $416_N$ that output SNR 1 $404_1$, SNR 2 $404_2$, ..., SNR N $404_N$.

Correction calculation module 420 includes one or more filter models 421, one or more time alignment modules 422, one or more correction factor calculation modules 423, one or more SNR factor correction modules 424, and one or more combinators 425.

In some embodiments, there may be provided one or more ideal ACF signals 405. Ideal ACF signal 405 may be provided as input to filter model 421. In some embodiments, there may be multiple ideal ACF signals 405, such as ideal ACF signal 1 $405_1$, ideal ACF signal 2 $405_2$, ... ideal ACF signal N $405_N$, which are calculated based on the replica code. The total number of ideal ACF signals 405, ranging codes, and replica codes may be a design choice of receiver 400, and may be dependent on the number of received RF signals. In some embodiments, one type of ideal ACF signal may be sufficient for a whole class of GNSS RF signals, such as GPS L1 C/A signals, Galileo E B/C signals, and/or other similar class of RF signals having similar spectral power distribution.

In some embodiments, since the ranging codes and the replica codes may be chosen any time prior to the calculations of correction factors, such as at the time of design, ideal ACF signal 405 may also be calculated at such time. Thus previously calculated ideal ACF signal 405 may be stored on one or more computer-readable storage media, and retrieved by correction calculation module 420 as needed. In some embodiments, ideal ACF signal 405 may correspond to $c_{acf}$ of equation (2).

In some embodiments, it may be desirable to limit a bandwidth of ideal ACF signal 405 in order to simplify calculations. For example, in order to sample a function or a signal with high fidelity, the sampling rate required may be prohibitively high for a function or a signal having a large bandwidth or a large frequency spread. In some embodiments, if the ranging code and the replica code are known to require a frequency spread higher than a threshold, the corresponding ideal ACF signal 405 may be band-limited by applying a linear-phase filter. In some embodiments, band limiting may be performed through mathematical operations, such as applying to the ideal ACF signal 405 an impulse function modeling a linear phase filter. In some embodiments, band-limited ideal ACF signal 405 may be calculated in advance, and stored in the one or more computer-readable media retrievable by correction calculation module 420. In some other embodiments, band-limited ideal ACF signal 405 may be calculated by correction calculation module 420 as needed.

In some embodiments, one or more filter models 421 may be provided to generate a model of the various filters as well as one or more of the additional filter elements or circuit components described above for receiver 400. The filters as well as one or more of the additional filter elements or circuit components may include LP filter 412, HP filter 413, an image rejection filter, a SAW filter, an amplifier and/or mixer having filtering functions which also exhibit non-linear phase behaviors. In some embodiments, there may be provided multiple filter models 421, one for each ideal ACF signal 405. Models generated by filter model 421 may be mathematical expressions that simulate the effect of the filters and filter like components on each ideal ACF signal 405. The mathematical expressions may be, for example, transfer functions or impulse functions, which correspond to h(k) in equations 1(a)-1(c). In some embodiments, the filters as well as one or more of the additional filter elements or circuit components may be known prior to correction factor calculation, and thus the model for filter model 421 may be calculated in advance, and stored on one or more computer-readable storage media, and may be retrieved by correction calculation module 420 as needed. In some embodiments, the model for filter model 421 may depend on operation conditions of receiver 400, and thus may require updates. In some embodiments, the model may depend on filter parameter 402, and may receive as input, filter parameter 402 from filter monitor 417. In some embodiments, filter model 421 may provide as output, modelled distorted ACF 406. In some embodiments, multiple filter models 421 may each provide as an output, modelled distorted ACF 406, corresponding to an input ideal ACF signal 405. For example, multiple filter models $421_1$, $421_2$, ..., $421_N$ may produce modelled distorted ACF 1 $406_1$, modelled distorted ACF 2 $406_2$, ..., modelled distorted ACF N $406_N$, corresponding to ideal ACF signal 1 $405_1$, ideal ACF signal 2 $405_2$, ... ideal ACF signal N $405_N$, respectively, according to filter parameter 402. In some embodiments, modelled distorted ACF 406 corresponds to $c_{acf}(k)*h(k)$ in equations 1(c).

One or more time alignment modules 422 align a time between ideal ACF signal 405 and modelled distorted ACF 406. Time alignment module 422 may receive as inputs, ideal ACF signal 405 and, from filter model 421, modelled distorted ACF 406. As previously described, modelled distorted ACF 406 may be delayed in time from ideal ACF signal 405. This delay may be deliberately introduced by filter model 421 in order to simulate effects of the various filters as well as one or more of the additional filter elements or circuit components of receiver 400. Time alignment module 422 may provide as outputs, ACF $407_a$ and $ACF_D$ $407_b$. ACF $407_a$ represents a series of taps, or time samples, of ideal ACF 405. $ACF_D$ $407_b$ represents a series of taps of modelled distorted ACF 406. In some embodiments, multiple time alignment modules $422_1$, $422_2$, ..., $422_N$ provide ACF 1 $407_{a1}$, ACF 2 $407_{a2}$ .... ACF N $407_{aN}$, and $ACF_D$ 1 $407_{b1}$, $ACF_D$ 2 $407_{b2}$, $ACF_D$ N $407_{bN}$, corresponding to ideal ACF signal 1 $405_1$, ideal ACF signal 2 $405_2$, ... ideal ACF signal N $405_N$ and modelled distorted ACF 1 $406_1$, modelled distorted ACF 2 $406_2$, ..., modelled distorted ACF N $406_N$, respectively, as shown in FIG. 4.

In some embodiments, time alignment module 422 aligns ideal ACF 405 signal and modelled distorted ACF 406 by calculating a time shift value by measuring a time shift between peaks of ideal ACF signal 405 and modelled distorted ACF 406. For example, time alignment module 422, from the taps of ideal ACF signal 405, may obtain a peak value of ideal ACF 405 and its corresponding tap. Similarly, time alignment module 422, from the taps of modelled distorted ACF 406, may obtain a peak value of modelled distorted ACF 406 and its corresponding tap. Time alignment module 422 determines the time shift value from the difference in the taps of the peaks of ideal ACF signal 405 and modelled distorted ACF 406. If, for example, the peak of modelled distorted ACF 406 is 5 taps shifted from the peak of the ideal ACF signal 405, then the time shift value is 5 taps. Time alignment module 422 then aligns ideal ACF signal 405 and modelled distorted ACF 406 by time shifting modelled distorted ACF 406 by the time shift value, either in taps or in measured time. In some embodiments, the $ACF_D$ $407_b$ may be time shifted by the time shift value, and ACF $407_a$ and $ACF_D$ $407_b$ are aligned at the output of time alignment module 422.

In some alternative embodiments, time alignment module 422 aligns ideal ACF signal 405 and modelled distorted ACF 406 by calculating a time shift value by minimizing a sum of squared errors, the errors being differences in amplitudes between ideal ACF signal 405 and modelled distorted ACF 406. For example, at each tap, a difference between the amplitudes of ideal ACF signal 405 and modelled distorted ACF 406, or error, may be found, and the errors for all taps are squared and summed to obtain a sum of squared errors. This process may be repeated, but with a different shift in tap in each iteration. The iteration that produces the least value, i.e., the minimum sum of squared errors, can be found in this process. The tap shift corresponding to this minimum sum of squared errors is the time shift value for aligning the ideal ACF signal 405 and modelled distorted ACF 406.

As previously described, taps are sample points in the delay domain of the auto-correlation function or the cross-correlation function. A number of taps within a time period corresponds to a delay period. For example, 1 MHz sampling frequency corresponds to a single tap having a 1 micro-second interval. Similarly, 1 GHz sampling frequency corresponds to a single tap having a 1 nano-second interval, and so on. In some embodiments, a sampling frequency is related with received RF signal 401. For example, the sampling frequency may be selected to be an integer multiple of a bandwidth or a frequency spread of RF signal 401. In some embodiments, the sampling frequency could be 4 times or 8 times the bandwidth of RF signal 401. For example, if RF signal 401 has a bandwidth of 1 MHz, the sampling frequency could be 4 MHz or 8 MHz.

In yet some other alternative embodiments, time alignment module 422 aligns ideal ACF signal 405 and modelled distorted ACF 406 by calculating a time shift value by using an estimate of an overall group delay of receiver 400. In some embodiments, the overall group delay may be an estimate with regard to the RF carrier frequency, and may be determined in advance. For example, components in receiver 400 may each cause some group delay. An estimate of the sum of these group delays may be obtained during testing or designing of receiver 400, with respect to the RF carrier frequency.

One or more correction factor calculation modules 423 receive as inputs ACF $407_a$ and $ACF_D$ $407_b$. Correction factor calculation module 423 provides as output, a correction factor 408. In some embodiments, multiple correction factor calculation modules $423_1$, $423_2$, ..., $423_N$ may receive as inputs ACF 1 $407_{a1}$, ACF 2 $407_{a2}$, ..., ACF N $407_{aN}$, and $ACF_D$ 1 $407_{b1}$, $ACF_D$ 2 $407_{b2}$, ..., $ACF_D$ N $407_{bN}$, respectively. Multiple correction factor calculation modules $423_1$, $423_2$, ..., $423_N$ provide as outputs, correction factor 1 $408_1$, correction factor 2 $408_2$, ..., correction factor N $408_N$, respectively.

In some embodiments, correction factor 408 is calculated by dividing ACF $407_a$ by $ACF_D$ $407_b$. This calculation corresponds to equation (3), where correction factor 408 corresponds to $T_c(k)$, ACF 407a corresponds to the numerator, and $ACF_D$ $407_b$ corresponds to the denominator.

In some embodiments, there may be provided one or more SNR factor correction modules 424. SNR factor correction module 424 receives as inputs, $ACF_D$ $407_b$ and SNR 404. In some embodiments, multiple SNR factor correction modules $424_1$, $424_2$, ..., $424_N$ each receive as input one of $ACF_D$ 1 $407_{b1}$, $ACF_D$ 2 $407_{b2}$, ..., $ACF_D$ N $407_{bN}$, and one of SNR 1 $404_1$, SNR 2 $404_2$, ..., SNR N $404_N$, respectively. In some embodiments, SNR 404 may be the same value for all measured distorted CCF 403. In some embodiments, SNR 1 $404_1$, SNR 2 $404_2$, ..., SNR N $404_N$ may respectively correspond to a SNR of measured distorted CCF 1 $403_1$, measured distorted CCF 2 $403_2$, ... measured distorted CCF N $403_N$.

In some embodiments, SNR factor correction module 424 provides as output, SNR factor 409. In some embodiments, multiple SNR factor correction modules $424_1$, $424_2$, ..., $424_N$ respectively provide as outputs, SNR factor 1 $409_1$, SNR factor 2 $409_2$, ..., SNR factor N $409_N$.

Combinator 425 receives as inputs correction factor 408 and SNR factor 409. In some embodiments, multiple combinators $425_1$, $425_2$, ..., $425_N$ respectively receive as inputs, one of correction factor 1 $408_1$, correction factor 2 $408_2$, ... correction factor N $408_N$, and one of SNR factor 1 $409_1$, SNR factor 2 $409_2$, ..., SNR factor N $409_N$. In some embodiments, combinator 425 provides as outputs to correction application module 430, correction factor 408 and SNR factor 409.

In some other embodiments, the effect of noise may be minor. Thus SNR and SNR factors may be ignored. For example, combinator 425 may only receive correction factor 408, and only output correction factor 408 to correction application module 430.

Correction application module 430 contains one or more correction modules 432. In some embodiments, correction module 432 receives as inputs correction factor 408 and SNR factor 409 from combinator 425. In some embodiments, multiple correction modules $432_1$, $432_2$, ..., $432_N$ respectively receive as inputs one of correction factor 1 $408_1$, correction factor 2 $408_2$, ..., correction factor N $408_N$, and one of SNR factor 1 $409_1$, SNR factor 2 $409_2$, ..., SNR factor N $409_N$. In some other embodiments, correction module 432 does not receive SNR factors 409.

Correction module 432 may also receive as input, measured distorted CCF 403. In some embodiments, multiple correction modules $432_1$, $432_2$, ..., $432_N$ respectively receive as inputs one of measured distorted CCF 1 $403_1$, measured distorted CCF 2 $403_2$, ... measured distorted CCF N $403_N$.

Correction module 432 applies correction factor 408 to measured distorted CCF 403 to produce a compensated CCF 450. In some embodiments, correction module 432 applies correction factor 408 and SNR factor 409 to produce compensated CCF 450. In some embodiments, correction module 432 may apply the correction factor 408 to measured distorted CCF 403 by multiplication, so that compensated CCF 450 is the product of the multiplication. Similarly, in some embodiments, correction module 432 may apply correction factor 408 and SNR factor 409 to measured distorted CCF 403 by multiplying all three values, so that compensated CCF 450 is the product of the multiplication. In some embodiments, multiple correction modules $432_1$, $432_2$, ..., $432_N$ respectively produce compensated CCF 1 $450_1$, compensated CCF 2 $450_2$, ..., compensated CCF N $450_N$. As previously described, taps are sample points in the delay domain, and measured distorted CCF 403 may be a series of taps at the output of signal correlator 415. Correction module 432 may map the set of correlation factors to a set of correlator taps. For example, correction module 432 applies correction factor 408 to measured distorted CCF 403, and compensated CCF 450 is outputted as a series of taps.

In some embodiments, it may not be necessary to calculate correction factor 408 and SNR factor 409 every time correction module 432 applies a correction. For example, once obtained, correction factor 408 and SNR factor 409 may be unchanged until occurrence of some conditions to justify updating correction factor 408 and SNR factor 409. In some embodiments, correction module 432 may apply the correction factor 408 at a first frequency, and correction factor 408 is calculated and updated at a second frequency. In some embodiments, the first frequency is greater than the second frequency. For example, a time interval between updates of the values of correction factor 408 and SNR factor 409 is longer than the time interval between correction applications by correction module 432. In some embodiments, the time interval between updates of the values of correction factor 408 may be on the order of several seconds, while the time interval between correction applications may be on the order of tens of milliseconds.

In some embodiments, correction calculation module 420 may update the values of correction factor 408 only when there is an update of filter model 421 by filter monitor 417. For example, when the operating conditions of receiver 400 remain relatively consistent, outputs of filter model 421 may be unaffected, and thus correction factor 408 would be unchanged. Therefore, correction factor 408 may not need updates if there is no change in the operating conditions of receiver 400. If the operating conditions of receiver 400 change such that outputs of filter model 421 are sufficiently affected, correction calculation module 420 may update the values of correction factor 408.

A person skilled in the art will now appreciate that correction calculation module 420 and correction application module 430 may be embodied as one or more processors performing signal processing operations. The various modules and submodules of correction calculation module 420 and correction application module 430 may be embodied as subcomponents of the one or more processors, one or more computer storage media, or software modules (such as computer-readable program instructions) programmed to cause the one or more processors to perform their respective signal processing operations.

Figure 5:
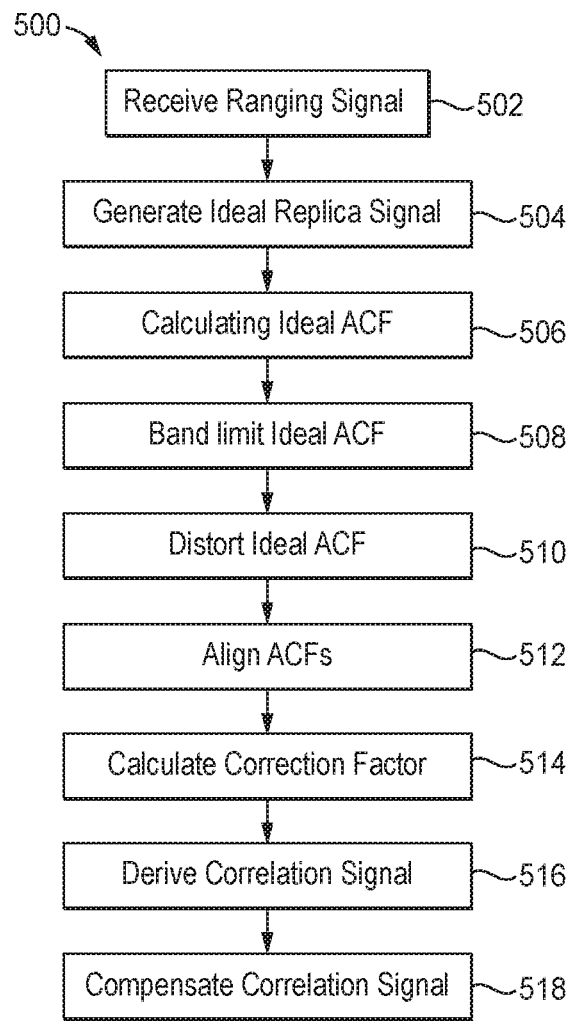
FIG. 5 is a flow chart illustrating an exemplary process for compensating variations in group delay, consistent with some embodiments of the present disclosure.

FIG. 5 is a flow chart illustrating an exemplary process performed by a receiver, such as receiver 400, for compensating variations in group delay.

In step 502, receiver 400 receives a ranging signal. The ranging signal may be a spread spectrum signal.

In step 504, receiver 400 generates an ideal replica signal containing replica codes corresponding to the received ranging codes. In some embodiments, receiver 400 retrieves a previously generated ideal replica signal from computer storage media.

In step 506, receiver 400 generates an ideal ACF based on the ideal replica signal. In some embodiments, receiver 400 retrieves a previously generated ideal ACF from computer storage media.

In step 508, receiver 400 may optionally band limit the ideal ACF. In some embodiments, the ideal ACF may be band limited by applying a linear-phase filter.

In step 510, receiver 400 distorts the ideal ACF to generate a distorted ACF. In some embodiments, the ideal ACF is distorted by applying a filter model to simulate effects of various filters in receiver 400.

In step 512, receiver 400 aligns the ideal ACF and the distorted ACF. In some embodiments, receiver 400 calculates a time shift value between the idea ACF and the distorted ACF, and then shifts the distorted ACF by the calculated time shift value.

In step 514, receiver 400 calculates a set of correction factors based on a ratio of the ideal ACF and the distorted ACF.

In step 516, receiver 400 generates a correlation signal. In some embodiments, the correlation signal is generated by cross-correlating the received ranging signal and the ideal replica signal.

In step 518, receiver 400 applies the correction factors to the correlation signal. In some embodiments, the correction factors are applied by multiplying the correction factors and the correlation signal. The product of the multiplication is the compensated correlation signal, for which variation in group delays is compensated.

Figure 6:
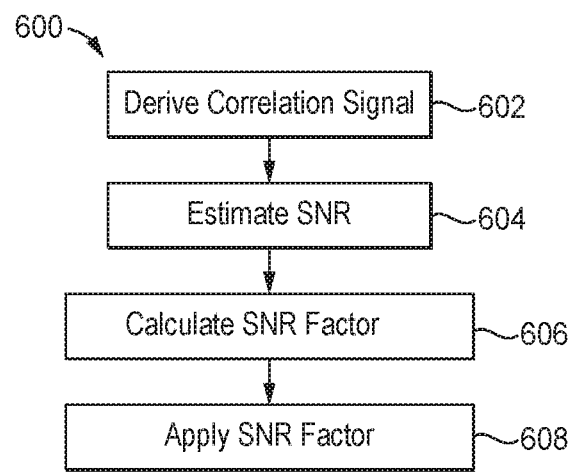
FIG. 6 is a flow chart illustrating an exemplary process for compensating variations in group delay based on SNR, consistent with some embodiments of the present disclosure.

FIG. 6 is a flow chart illustrating an exemplary process performed by a receiver, such as receiver 400, for compensating variations in group delay based on SNR. In some embodiments, process 600 may be performed in addition to process 500.

In step 602, receiver 400 generates a correlation signal. In some embodiments, the correlation signal is generated by cross-correlating the received ranging signal and the ideal replica signal.

In step 604, receiver 400 derives an estimate of signal-to-noise ratio (SNR) of the correlation signal.

In step 606, receiver 400 calculates a set of SNR factors based on the estimate of the SNR.

In step 608, receiver 400 applies the SNR factors to the correlation signal. In some embodiments, the SNR factors are applied by multiplying the correction factors, the SNR factors, and the correlation signal. The product of the multiplication is the compensated correlation signal, for which variation in group delays is compensated. In some embodiments, the SNR factors are applied to the correlation signal at the same time as the correction factor is applied to the correlation signal in step 518 of process 500.

The computer-readable storage media of the present disclosure may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments," "another embodiment" or "alternative embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely an example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A method for compensating group delay variations in a CDMA spread spectrum receiver, comprising:
   receiving an RF signal;
   generating an ideal replica signal;
   filtering the RF signal by one or more filters;
   obtaining an ideal auto-correlation function (ACF) of the ideal replica signal;
   distorting the ideal ACF to generate a distorted ACF by a filtering model of the one or more filters;
   aligning the ideal ACF and the distorted ACF;
   calculating a set of correction factors based on a ratio of the ideal ACF and the distorted ACF;
   calculating a cross-correlation signal based on the filtered RF signal and the ideal replica signal; and
   obtaining a compensated correlation signal by applying the set of correction factors to the cross-correlation signal.

2. The method of claim 1, further comprising band limiting the ideal ACF by applying a linear-phase filter.

3. The method of claim 1, further comprising:
estimating a signal-to-noise ratio (SNR) of the cross-correlation signal;
calculating a set of SNR factors based on the estimated SNR of the cross-correlation signal; and
further modifying the set of correction factors based on the set of SNR factors before applying the set of correction factors to the cross-correlation signal.

4. The method of claim 1, wherein the ideal ACF is determined prior to receiving the RF signal.

5. The method of claim 4, wherein the ideal ACF is obtained from a storage medium.

6. The method of claim 1, wherein the distorted ACF and the ideal ACF are aligned by calculating a time shift value between a peak amplitude of the distorted ACF and a peak amplitude of the ideal ACF.

7. The method of claim 1, wherein the RF signal is modulated by an RF carrier frequency, and the distorted ACF and the ideal ACF are aligned by calculating a time shift value based on a total group delay of the RF carrier frequency.

8. The method of claim 1, wherein the distorted ACF and the ideal ACF are aligned by calculating a time shift value based on a minimum of a sum of squared errors, wherein the errors are differences in amplitudes between the distorted ACF and the ideal ACF.

9. The method of claim 1, wherein the RF signal has a frequency spread; and
a sampling frequency of the ideal ACF is an integer multiple of the frequency spread.

10. The method of claim 9, wherein the integer multiple is 4.

11. The method of claim 9, wherein the integer multiple is 8.

12. The method of claim 1, further comprising monitoring parameters of the one or more filters.

13. The method of claim 12, wherein the filtering model of the one or more filters is generated based on the parameters of the one or more filters.

14. The method of claim 1, wherein applying the set of correction factors to the cross-correlation signal comprises multiplying the set of correction factors with the cross-correlation signal.

15. The method of claim 1, further comprising mapping the set of correlation factors to a set of correlator taps.

16. The method of claim 1, wherein the set of correction factors is applied to the cross-correlation signal at a first frequency; the set of correction factors is updated at a second frequency; and the first frequency is greater than the second frequency.

17. The method of claim 16, wherein the updating of the set of correction factors is triggered by a change in the parameters of the one or more filters.

18. The method of claim 1, wherein the CDMA spread spectrum receiver is a global navigation satellite system (GNSS) receiver.

19. The method of claim 1, further comprising:
filtering the received RF signal by a receiving filter, the RF signal being received at an RF carrier frequency;
down-converting the RF signal from the RF carrier frequency to a baseband frequency; and
filtering the down-converted RF signal by the one or more filters.

20. A CDMA spread spectrum device for compensating group delay variations, comprising:
a receiver configured to receive an RF signal;
one or more filters configured to filter the RF signal; and
at least one processor configured to:
generate an ideal replica signal;
obtain an ideal auto-correlation function (ACF) of the ideal replica signal;
distort the ideal ACF to generate a distorted ACF by a filtering model of the one or more filters;
align the ideal ACF and the distorted ACF;
calculate a set of correction factors based on a ratio of the ideal ACF and the distorted ACF;
calculate a cross-correlation signal based on the filtered RF signal and the ideal replica signal; and
obtain a compensated correlation signal by applying the set of correction factors to the cross-correlation signal.

* * * * *